United States Patent [19]

Bailey

[11] Patent Number: 5,501,142
[45] Date of Patent: Mar. 26, 1996

[54] STEAMER DEVICE FOR COOKING FOOD IN A GRILL

[75] Inventor: Richard D. Bailey, Dawson Springs, Ky.

[73] Assignee: Bailey Steamer, Madisonville, Ky.

[21] Appl. No.: 169,349

[22] Filed: Dec. 17, 1993

[51] Int. Cl.⁶ ................................................. A23B 4/044
[52] U.S. Cl. .................. 99/482; 99/345; 99/467
[58] Field of Search .......................... 99/345, 347, 467, 99/473, 516, 483; 126/25 R, 29, 5, 348, 369, 344

[56] References Cited

U.S. PATENT DOCUMENTS

| | | |
|---|---|---|
| 2,515,521 | 7/1950 | Loffredo . |
| 3,088,393 | 5/1963 | Huckabee . |
| 4,020,322 | 4/1977 | Muse . |
| 4,066,010 | 1/1978 | Larsson . |
| 4,140,049 | 2/1979 | Stewart . |
| 4,732,137 | 3/1988 | Parsons . |

Primary Examiner—David Scherbel
Assistant Examiner—Tony G. Soohoo
Attorney, Agent, or Firm—Wood, Herron & Evans

[57] ABSTRACT

The steamer device of the present invention is an elongated enclosed structure which is configured to receive and contain an amount of steamer liquid. The steamer device is placed within a bed of heated grill briquettes below the grilling surface of a grill assembly. The steamer device uses the heat from the briquettes to evaporate the steamer liquid and create flavored steam. Steam release openings formed in the enclosed structure direct the steam out of the device and towards the grilling surface to flavor the food being grilled on the surface. When the grilling surface and steamer device are enclosed, a steam atmosphere is created which flavors and moistens the food while providing a quicker cooking time and reduced flaming. The steam device does not alter operation of the grill nor prevent the natural juices of the food from falling onto a heated surface and being burned or evaporated to further flavor the grilled food. The device is inexpensive and simple to operate and functions continuously to steam the food while it cooks.

12 Claims, 1 Drawing Sheet

STEAMER DEVICE FOR COOKING FOOD IN A GRILL

FIELD OF THE INVENTION

This invention relates to cooking food within a grill, and particularly to a device and method to steam and flavor the grilled food while it is being cooked.

BACKGROUND OF THE INVENTION

Grilling or barbecuing food, such as with a conventional outdoor grill, has become very popular. One reason for its popularity is that outdoor or even indoor grilling imparts a unique and desired taste to the prepared food. In particular, meats, vegetables and a variety of other foods are grilled to have a different taste that is not achieved when the foods are prepared in a conventional way, such as with a stove or oven or in a frying pan.

Generally, outdoor grills or barbecues, as they are sometimes called, comprise an oven-like housing which contains a food support or grilling surface. The grilling surface includes a plurality of spaced bars, usually metal, which are parallel or crisscrossed to form a grill-like surface. Hence the name. The grill also includes a heating element to heat and cook food placed on the cooking surface. Generally, the heating element of a grill comprises a plurality or bed of briquettes which are heated by a flame to radiate heat to the food on the grilling surface. When grilling, the radiated heat normally passes directly to the food through the grill bars, without being obstructed.

The briquettes used for grilling may be made of disposable charcoal, which are lighted on fire and consumed by the fire as the food is cooked. Alternatively, in a gas grill, permanent rock-like. briquettes or lava rocks are heated by use of a gas flame to cook the food and may be used and re-used time and again. The radiated heat from the briquettes cooks the food, and the open grilling surface allows the drippings and juices from the food to fall onto the briquettes where the drippings are vaporized or burned to provide steam or smoke, respectively, which flavors the food. One drawback to grilling food, however, is that the food may be dried out or overcooked due to the direct heat of the briquettes which is not as easily controlled as the heat from a stove or oven. Furthermore, the drippings from the food cause flaming which sears the food further drying it and sealing it to prevent the desired thorough cooking of the food.

It is often desirable when grilling food, to impart a unique flavor to the food which is different and in addition to that flavor imparted by the grilling and the food's own natural juices. This is done by steaming or smoking the food while it cooks with a uniquely flavored steam or smoke. The flavored steam or smoke created by the heat of the grill permeates the food and imparts a unique taste thereto. Mesquite wood chips are sometimes burned while grilling to impart the flavor of the wood smoke to the meat. However, it may be desirable to provide other unique flavorings to the food, such as from a favorite liquid or sauce. Some flavoring can be accomplished by hand basting the food with the liquid or sauce as it cooks. However, basting requires continual attention to the basting process at regular intervals which is both inconvenient and messy. Further, hand basting may be uncomfortable and even dangerous, as the basting liquid must be applied to the food often over an open flame or heated briquettes. Additionally, too little basting, or late basting after the food is seared and cooked a certain amount, leaves the food dehydrated and only slightly flavored or smoked.

Several prior art devices have been utilized to periodically or continuously baste or steam food cooked in a grill. The prior art basting structures are complicated and expensive, while the prior art steamer devices prevent the desired flavoring of the food that is associated with the food's own natural juices by capturing the drippings which normally fall onto the heated briquettes to vaporize or burn.

Therefore, there is a need for an inexpensive, simple and effective way to steam or smoke food cooked on a grill to impart a unique flavor from a favorite liquid or sauce. There is further a need for a way to flavor the food while allowing the natural juices of the food to also participate in the flavoring. Still further, there is a need for a steamer device and method which operates automatically and continuously as the food cooks to free the cook from the task of continuously monitoring the flavoring process. There is a still further need for a simple steaming device which hydrates the food as it flavors the food and prevents flaming so that the food cooks thoroughly without searing.

SUMMARY OF THE INVENTION

In accordance with these needs, the present invention provides a simple, effective and relatively inexpensive way to flavor meat with a chosen flavor from a favorite liquid or sauce through the use of steam. The steamer device and process of the present invention may be utilized with any desired liquid to impart the flavor of the liquid to the grilled food. The device is easy to install and use within any conventional gas or charcoal grill and operates by receiving heat from the heating element of the grill, such as the heated briquettes. Once installed, and filled with the desirable steamer liquid, the steamer device flavors and moistens the food continuously while it cooks, while allowing drippings and juices from the cooked food to fall from the food and evaporate or burn to further flavor the food. The steamer device operates continuously as long as the food is being cooked and does not require any attention during the cooking process provided there is an ample supply of steamer liquid in the device. Furthermore, the steam environment promotes quicker cooking of the food while reducing flaming which tends to sear and burn the grilled food. Still further, the additional flavoring to the food from the present invention reduces the necessity to add salt for flavor making the food healthier.

To this end, the steamer device of the present invention includes an elongated enclosed tubular structure which is configured to be placed proximate the heating element of a grill and below the food support or grilling surface of the grill. The enclosed tubular structure is placed proximate the heating element, such as a bed of heated briquettes, to receive heat from the element, such as a plurality of heated briquettes. The enclosed structure is filled with a steamer liquid and the heat from the briquettes is transferred to the liquid by the enclosed structure to evaporate the liquid. The steam from the evaporated liquid within the enclosed structure is released by a series of steam release openings or holes located on an upper surface of the enclosed tubular structure. The release openings are preferably directed upwardly towards the food on the grilling surface.

In use, the steamer device is filled with the desired steamer liquid, which may be wine, beer, or any number of an infinite variety of seasoned or flavored liquids. When the steamer device is heated by the briquettes, the steam release openings direct the flavored steam upwardly towards the grilling surface to surround and permeate the food being cooked. The steam imparts the flavor from the liquid to the grilled food. The steam further moistens the food while it flavors to prevent the food from drying out. At one end of the enclosed structure there is an enlargened fill opening or hole which is also directed upwardly for filling the steamer device with the desired steamer liquid. The fill hole is dimensioned larger than the steam release openings so that a funnel or other similar utensil might be utilized to facilitate filling the device with steamer liquid. During steaming, the fill hole acts as an enlargened steam release opening.

The steamer device of the present invention is preferably made of metal to more efficiently transfer heat from the grill heating element to steamer liquid. It is dimensioned to lie lengthwise at the bottom of the grill, either in the center of the grill or to one side thereof. The steamer device of the present invention is preferably placed on the platform with the briquettes although it may also be placed elsewhere in the grill housing such as next to the gas burner of a gas grill. When the steamer device is placed with the briquettes and preferably surrounded on at least two sides by briquettes, the device is operable to radiate heat itself so as not to greatly disrupt the continuous heating surface of the bed of briquettes. The steamer device does not interfere with the radiated heat cooking the food or block the natural juices or drippings falling from the food. The natural drippings contact the briquettes or the steamer device and vaporize to provide additional steam or smoke which is desired to further flavor the food with its own natural flavor.

The steamer device also provides faster cooking times for the food while reducing the normal flaming that occurs in grills which tends to sear char the outside of the grilled food while the inside remains uncooked. Specifically, the steam environment created by the present invention has been found to cook the food faster. However, while the food cooks faster, the moisture from the steam and the penetration of that moisture into the food prevents burning of the outside of the food while the inside is cooked. The resulting grilled food is both moist and tender. Further, the moisture of the steamer device reduces the flaming and flare-ups caused by the food drippings and grill flames, and hence, prevents the meat from being burned or seared.

The steamer device is easily installed and used by embedding it within the briquettes and filling it with steamer liquid. Thereafter, when the grill is lighted and functioning, the steamer device continually provides any kind of flavored steam to the food. The device does not need any further attention from the cook as long as there is steamer liquid inside the enclosed structure. The invention is inexpensive and durable, with no moving parts to malfunction or need replacement. These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE DRAWINGS

Figure 1:
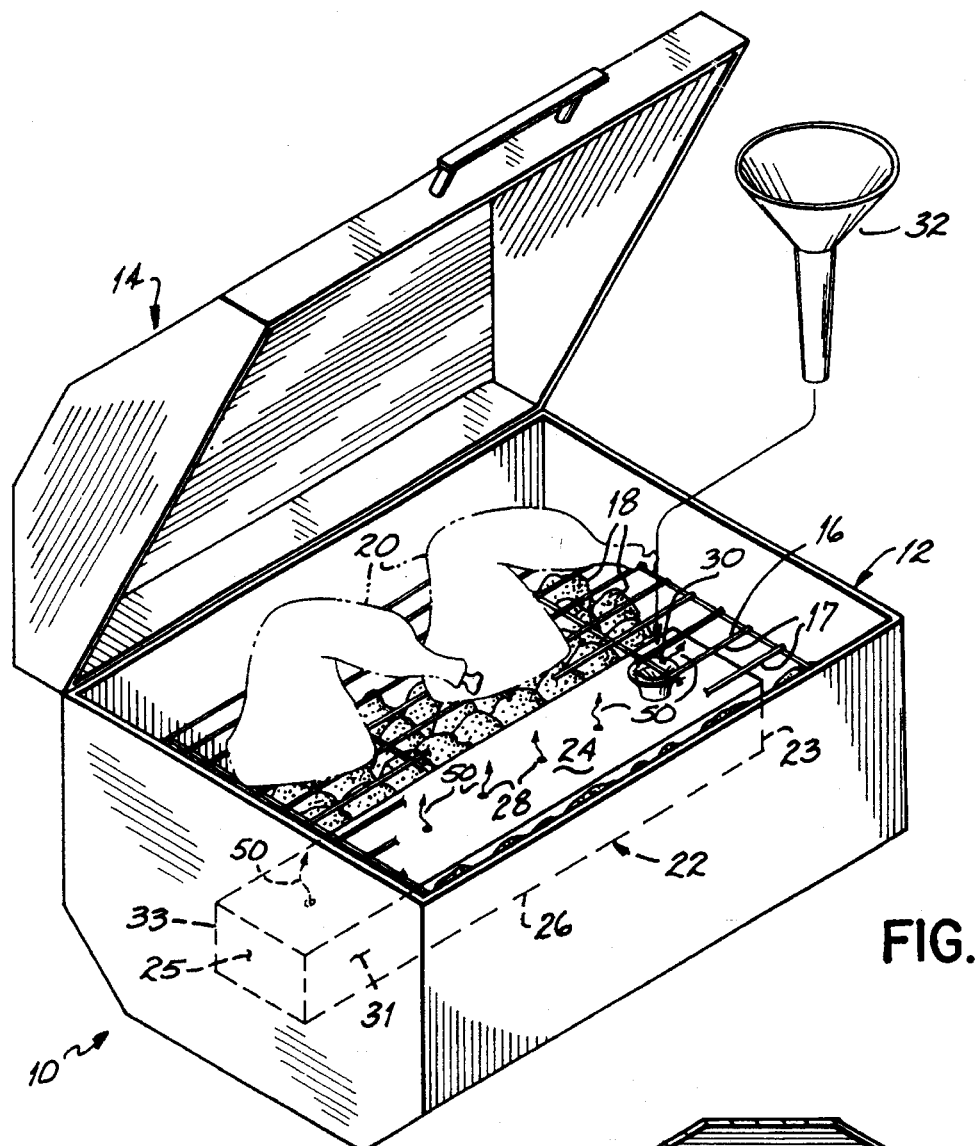
FIG. 1 is a front perspective view of one embodiment of the steamer control device shown installed within a grill according to the principles of the present invention.

Referring to FIG. 1, a grill assembly 10 is shown having a lower grill housing 12 with a hingable lid 14 for covering the lower grill housing 12 to create an oven-like effect. Within housing 12 is a food support or grilling surface 16 which is made up of a plurality of spaced parallel bars 17. The grilling surface 16 elevates the food being cooked in the grill assembly 10, such as chicken legs 20, away from the heating element of the grill assembly 10 in the bottom of the housing 12, so that the food 20 does not contact the heating element and burn, but is instead cooked more slowly thereabove.

The grill assembly 10 of FIG. 1 is a conventional gas grill which uses a bed of rock-like briquettes or lava rocks 18 below the grilling surface 16 as a heating element. The briquettes 18 are permanent, re-usable rocks which are heated utilizing a gas flame burner or other suitable heating mechanism. (See FIG. 2) The heated briquettes radiate heat to the grilling surface 16 to cook food 20. Alternatively, the briquettes 18 may be conventional charcoal briquettes which are lighted, such as with matches and lighter fluid, and which are consumed as they burn to radiate heat. The burned charcoal briquettes leave only a pile of ashes when they are completely used and are not re-usable. The briquettes 18 are preferably arranged in a continuous surface or bed to evenly distribute the radiated heat to the grilling surface 16 to cook the food 20. Once the briquettes are heated, lid 14 may be brought down to enclose grilling surface 16 and food 20 and capture the heat from the briquettes 18. The oven-like effect of the trapped heat can be utilized to cook the food more rapidly, if desired.

Steamer device 22 of the present invention is shown in FIG. 1 embedded within the bed of heated briquettes 18. Steamer device 22 is an elongated enclosed tubular structure closed at both ends 23, 25 which is configured to lie lengthwise beneath the grilling surface 16 of grill assembly 10. Alternatively, in grills using heating elements other than briquettes, the steamer device 22 would be placed proximate the heating element to receive heat therefrom. In one embodiment, the steamer device 22 is an enclosed rectangular tube having a generally flat upper surface 24, lower surface 26 and side surfaces 31 and 33. The steamer device 22 holds an amount of steamer liquid 46 (See FIG. 2) and is heated whereby to create steam 50 and flavor the food being cooked in the grill assembly 10 as is described further hereinbelow. In the upper surface 24 of steamer device 22 there are formed steam release openings or release holes 28 which direct the steam from inside the device 22 upwardly to the grilling surface 16 and food 20 in the grill assembly 10. The plurality of steam release holes 28 preferably extend generally along the length of steamer device 22 to distribute the steam evenly around the food 20 and grilling surface 16 and promote even steaming and flavoring of the food.

To use the invention, steamer fluid is poured into steamer device 22 through a fill opening or fill hole 30 located proximate one end of device 22. Preferably, the steamer liquid 46 is filled to within one-half inch of the top of the device 22, although it may be completely filled. The fill hole 30 is shown in line with the steam release holes 28; however, such alignment is not necessary for operation of the device 22. Fill hole 30 is dimensioned larger than the steam holes so that a filling apparatus, such as funnel 32, may be placed therein to facilitate easier filling of the device 22 (See FIG. 1). The fill hole 30 has an annular lip around its periphery to guide funnel 32 into the hole 30 and prevent spilling. The desirable steamer liquid such as beer, wine or any one or several of an infinite variety of other seasoned or flavored liquids is poured into the funnel 32 which drains into steamer device 22 through fill hole 30. The liquid is enclosed within device 22 and held until it is evaporated into steam.

Figure 2:
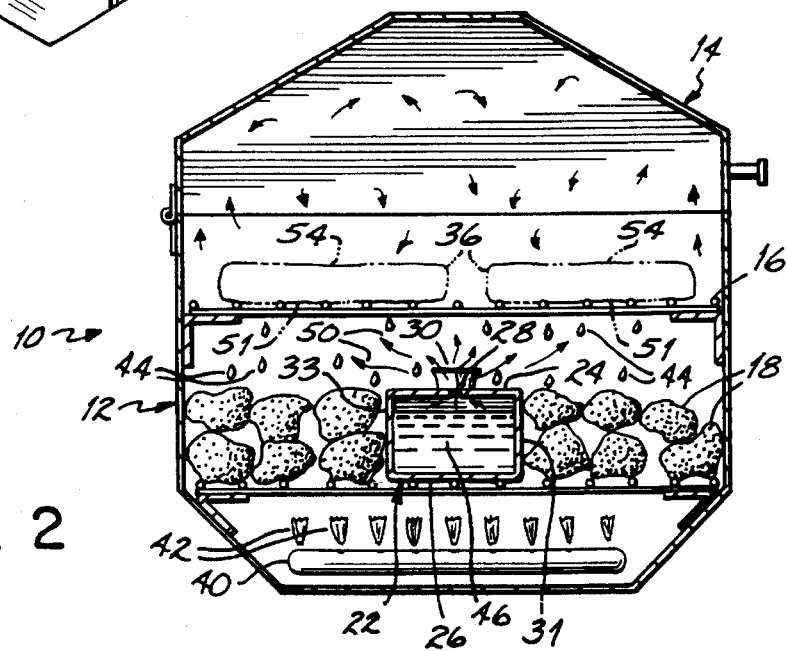
FIG. 2 is a side cross-section of the steamer device within the grill of FIG. 1.

The steamer device 22 is preferably made of a heat conducting material such as metal. As shown in FIGS. 1 and 2, one possible way of efficiently heating the steamer device 22 is to embed the device in the bed of heated briquettes 18. Alternatively, the steamer device 22 might be placed on top of the briquettes 18. The briquettes 18 contacting one or more surfaces of the steamer device 22, such as side surfaces 31, 33, efficiently transfer their heat to the device 22 which then conducts heat to the steamer liquid 46 within device 22. The heat evaporates the liquid 46 and forms steam 50 which is directed out of the steam release holes 28 toward the grilled food 20 to flavor the food. As the food 20 cooks, the steamer device 22 is continually heated by briquettes 18 and will continually provide steam 50 to the inside of the grill assembly 10 as long as there is steamer fluid 46 within device 22 and the briquettes are hot.

Referring now to FIG. 2, a side cross-sectional view of the gas grill assembly 10 shown in FIG. 1 is illustrated with the lid 14 down and with like numbers referring to like components. The lower grill housing 12 in conjunction with hingable lid 14 encloses grilling surface 16 with a bed of briquettes 18 to transfer heat to the grilling surface 16 and cook the food thereon. Since the grill assembly 10 is a gas grill, the briquettes 18 are initially heated and maintained in a heated state during cooking of the food by gas burners 40 or some other suitable heating device. The flames 42 from gas burners 40 heat briquettes 18 which then radiate heat toward the food 25, which may be meat steaks as shown in FIG. 2. In this way, the food 36 is kept elevated away from the direct flame 42 which achieves better heat and temperature control for more accurate and thorough cooking of the food 36.

In the cross-section of steamer device 22 shown in FIG. 2, a level of steamer liquid 46 is shown. The steamer device 22 is shown embedded in the heated briquettes 18 which contact its opposing vertical sides 31 and 33 to heat the device 22. Further heating of device 22 might be provided by flames 42 from gas burner 40 which heats the lower surface 26 of device 22 directly if there are no briquettes in the way. The evaporated steam molecules 50 from device 22 then escape through the steam release holes 28 and also through fill hole 30 which direct the steam upwardly towards grilling surface 16 and the food 36 being cooked in the grill. As shown in FIG. 2, the steam 50 strikes various surfaces of the food 36. The steam permeates into the food 36 and imparts the flavor of the steamer liquid 46 to the food. For example, if wine is utilized as steamer liquid 46 within device 22, the steam will be composed of evaporated wine molecules and will impart a wine flavoring to the food 36. Alternatively, other seasoned or flavored liquids, such as beer, will impart different flavors to the grilled food.

Steam 50, directed upwardly from steamer device 22, strikes the bottom surface 52 of the food 36. When lid 14 of the grill assembly 10 is closed, some of the steam 50 is deflected around inside the grill to strike other surfaces, such as the top surface 54 of food 36. Preferably, a steam atmosphere is formed within the grill assembly 10 by the steamer device 22, so that all exposed surfaces of the food 36 are contacted by the steam 50. Alternatively, if lid 14 is up, as shown in FIG. 1, some of the steam 50 escapes out the top of the grill but a large portion of the steam 50 still contacts the bottom surface 52 of the food 36.

The steam 50 circulates around the inside of the grill assembly 10 to create a steam atmosphere, and impart the steam flavor to the food 36. However, the steam 50 also affects the operation of grill assembly 10 and the cooking of food 20. It has been found that the steamer device 22 provides faster cooking times for the food than if the food is cooked in the grill 10 without steam 50. Simultaneously, the steamer device 22 reduces the normal flaming that occurs in grills. This reduced flaming promotes thorough cooking of the food 36 and prevents burning. For example, flaming occurs when the natural juices or drippings 44 of the grilled food 36 fall down onto the hot briquettes 18 or gas burner 40 catching fire and burning. The flames and flare-ups from the drippings 44 tend to sear char the food and cook the outside of the food while leaving the inside uncooked. One way that has been used in the past to prevent flaming and burning of the food is to use a spray bottle to dowse the briquettes 18 and food 36 with water. Additionally, it was necessary to constantly flip the food to prevent burning.

As may be appreciated, such attention to, the flames and food is both time consuming and undesirable and sometimes results in removing the food before it is completely done cooking. The present invention creates a moist, steamy atmosphere within the grill 10. The moisture reduces the flaming by retarding the flames on the grilling surface 16 and briquettes caused by the drippings 44. At the same time, the steam atmosphere promotes quicker cooking times. The need for a spray bottle is eliminated and it is no longer necessary to constantly flip the food 36 and remove it from the grilling surface 16 before it is completely cooked inside to prevent an outside burn. As a result, grilling becomes a more pleasurable and worry-free experience using the present invention, and the food may be seasoned and cooked to the desired state without fear of it being burned on the outside and undercooked on the inside.

Furthermore, steam 50 contains moisture which hydrates the food in order to prevent it from drying out while being grilled by the heat of briquettes 18. Thus, the food remains moist and tender even though the food is cooked faster. Furthermore, because of the moisture, the food may be cooked longer, if necessary, without drying out. In addition to hydrating the food, the steamer device 22 operates to allow the natural juices and drippings 44 of the food 36 being cooked on grilling surface 16 to fall between the individual grill bars 17 and contact a heated surface such as briquettes 18 or the top surface 24 of steamer device 22. As described further hereinbelow, the drippings are burned or evaporated to provide smoke or steam, respectively, to further flavor and season the food on grilling surface 16.

As seen in FIG. 2, steamer device 22 operates in conjunction with the bed of briquettes 18 at generally the level of the briquettes, and therefore, does not block or otherwise deter the radiant heat from briquettes 18 from reaching the food 36 on grilling surface 16. In this way, the normal operation of the grill is not altered. In fact, the steamer device 22 does not have to always be used and can remain permanently in place without affecting standard grilling of the food.

As the food 36 cooks, various juices and drippings 44, such as melted fat from meat steaks, fall downwardly through the parallel grill bars 17 of grilling surface 16 to contact briquettes 18 or the top surface 24 of steamer device 22. As may be appreciated, the top surface 26 of the steamer device is also hot because the heat from the briquettes 18 is conducted throughout the length of the elongated tubular structure 22. The drippings which contact the heated briquettes 18 and surface 24 are burned or evaporated by the heat to provide smoke or additional steam, respectively, which circulates within the grill assembly 10 to further flavor the food. The various smoke and steam from food drippings 44 provides the unique taste in the food which those persons grilling their food desire. Accordingly, the present invention promotes additional flavoring of the food while maintaining the natural flavoring which is achieved with the grilling process. In accordance with the objectives of the invention, the steam release holes 28 on the top surface 24 of device 22 are preferably dimensioned small enough so that they allow the steam 50 from steamer liquid 46 to be released from device 22 and directed upwardly towards the food 44, but prevent the natural drippings and juices 44 from getting within the enclosed steamer device and mixing with the steamer liquid 46.

In operation, steamer liquid 46 is poured into steamer device 22 which produces steam as long as there is liquid in the device. As the food 36 cooks, steam 50 is produced continuously to flavor the food. It is not necessary to monitor or adjust steamer device 22 during cooking, as it will operate as long as there is a sufficient liquid level within. Such ease of use allows the cook to concentrate on the preparation and cooking of the grilled food.

In summation, the steamer device 22 of the present invention may be used as follows:

First, the steamer device 22 is filled with a steamer liquid 46 preferably up to within one-half inch of the top of the steamer device 22. Next, the lid 14 of the grill is closed and the steamer liquid 46 is brought to a boil within device 22. Upon the creation of steam 50 by steamer device 22, the desired meats, vegetables, or other foods are placed on the grilling surface 16 and the lid is closed. As the food cooks, the steam permeates the surface of the food and flavors it with the flavor of the steamer liquid. At that point, all that is necessary is to check the steamer liquid level periodically and to add more liquid if necessary. Keep in mind, that the cooking time using the present invention will be quicker, so the gas burner 40 or other heating mechanism should be adjusted accordingly if so possible. The present invention may be easily cleaned by removing it from the grill and flushing it out with water.

The steamer device 22 of the present invention is simple to install and use and functions continuously during grilling without any further operation or adjustment. As long as the briquettes 18 are heated and there is steamer liquid 46 within device 22, the device will continue to produce steam 50. The device provides steam to flavor and moisten food cooked in the grill assembly 10, and since the device 22 does not interfere with the heating mechanism of the grill, it does not effect the operation of the grill or the cooking times needed for specific foods. Flaming is reduced and the cooking time is reduced for quicker food preparation without drying or burning the food. The cook is left to concentrate on the food and its condition. Any evaportable flavored liquid may be used with the present invention to impart a unique steamed flavor to the food. Such steam flavoring eliminates the necessity to use salt for flavor and makes for a more healthy diet. When cooking and steaming is complete, the steamer device 22 may be easily removed for cleaning and is durable to be used and re-used time and again.

While the present invention has been illustrated by the description of embodiments thereof, and while the embodiments have been described in considerable detail, it is not the intention of Applicants to restrict or in any way limit the scope of the appended claims to such detail. Additional advantages and modifications will readily appear to those skilled in the art. For example, the elongated enclosure structure of the steamer device 22 might be shaped other than rectangular, while still providing the same or equivalently similar operation. Furthermore, the steam release openings might be slits, as opposed to holes, or may be some other equivalent configuration to direct the evaporated steamer liquid out of the device and toward the food. Alternatively, one or more steamer devices might be utilized within a grill to increase the production of seasoning steam. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A refillable steamer device for placement in a grill having a grilling surface and a heating element to steam the food cooked within the grill, the steamer device comprising:

an elongated enclosed structure having side surfaces and top and bottom surfaces, the side and bottom surfaces being formed with a liquid-tight construction to create an enclosed interior volume to hold a steamer liquid, the enclosed structure configured to be placed proximate the grill heating element and entirely below said grilling surface with the top surface facing upwardly toward the grill surface;

a steamer liquid filling a portion of the enclosed interior volume and contacting a section of the bottom and side surfaces, the bottom and side surfaces of said enclosed structure operable to receive heat from the heating element and to evaporate the steamer liquid and create a steam environment within the enclosed interior volume;

a plurality of steam release openings formed in the top surface of the enclosed structure along the length thereof, the openings extending into the steam environment of the interior volume and venting steam from the enclosed structure, the steam release openings directing the vented steam upwardly into the grill and toward the grilling surface from below the surface along the length thereof to flavor food being cooked on said surface;

a filling opening formed in the top surface of the enclosed structure and extending into the interior volume for filling and refilling the interior volume with steamer liquid, said filling opening being dimensioned larger than said steam release openings to facilitate easier filling and refilling of the enclosed structure;

whereby a preferred liquid may be used to steam the grilled food to impart the flavor of the steamer liquid to the food and to increase the cooking speed of the food and the steamer device may be refilled for proper steaming.

2. The steamer device of claim 1, the steam release openings being dimensioned and arranged to direct the steam upwardly but to substantially prevent downward falling drippings from the grilled food from entering the interior volume and mixing with the steamer liquid in the interior volume so that the drippings contact the hot enclosed structure and the heating element to burn and further flavor the food.

3. The steamer device of claim 1 wherein the filling opening is positioned proximate an end of the enclosed structure so as to be located away from a major portion of the heating element when the enclosed structure is positioned proximate the heating element to facilitate a safer, easier filling and refilling of the structure with steamer liquid.

4. The steamer device of claim 1, the fill opening including an upwardly extending lip to guide a filling device into the filling opening to facilitate easier filling and refilling of the interior volume.

5. The steamer device of claim 1 wherein the enclosed structure has a flat bottom surface to rest on a flat plane support below the grilling surface of the grill.

6. The steamer device of claim 1 wherein the side and bottom surfaces of the enclosed structure are made of metal to rapidly transfer heat from the heating element to the steamer liquid to create steam in the interior volume.

7. The steamer device of claim 1 the elongated enclosed structure being rectangular in transverse cross-section and having generally flat bottom and side surfaces.

8. A grill for steaming and flavoring food cooked therein comprising:

a housing;

a grilling surface in the housing;

a heating element proximate the grilling surface to heat and cook food on said surface; and a refillable steamer device comprising:

an elongated enclosed structure having side surfaces and top and bottom surfaces, the side and bottom surfaces being formed with a liquid-tight construction to create an enclosed interior volume to hold a steamer liquid, the enclosed structure configured to be placed proximate the heating element and entirely below said grilling surface with the top surface facing upwardly toward the grill surface;

a steamer liquid filling a portion of the enclosed interior volume and contacting a section of the bottom and side surfaces, the bottom and side surfaces of said enclosed structure operable to receive heat from the heating element and to evaporate the steamer liquid and create a steam environment within the enclosed interior volume;

a plurality of steam release openings formed in the top surface of the enclosed structure along the length thereof, the openings extending into the steam environment of the interior volume and venting steam from the enclosed structure, the steam release openings directing the vented steam upwardly into the housing and toward the grilling surface from below the surface along a length thereof to flavor food being cooked on said surface;

a filling opening formed in the top surface of the enclosed structure and extending into the interior volume for filling and refilling the interior volume with steamer liquid, said filling opening being dimensioned larger than said steam release openings to facilitate easier filling and refilling of the enclosed structure;

whereby a preferred liquid may be used to steam the cooked food to impart the flavor of the steamer liquid to the food and to increase the cooking speed of the food and the steamer device may be refilled for proper steaming.

9. The grill of claim 8, wherein the steam release openings are dimensioned and arranged to direct the steam upwardly out of the enclosed structure but to substantially prevent downward falling drippings from food cooked in the grill from entering the interior volume and mixing with the steamer liquid in the interior volume so that the drippings contact the hot enclosed structure and the heating element to burn and further flavor the food.

10. The grill of claim 8, the heating element comprising a plurality of heated briquettes, said steamer device being in contact with the heated briquettes to receive heat therefrom and evaporate the steamer liquid to create steam.

11. The grill of claim 10 wherein the steamer device is embedded in the plurality of heated briquettes to more efficiently heat the steamer device.

12. The grill of claim 8 wherein the housing comprises a cover which may be closed to enclose the grilling surface and steamer device together to trap the upwardly directed steam in an enclosed environment and more effectively flavor the food being cooked in the grill.

\* \* \* \* \*